July 8, 1952    B. O. BUCKLAND ET AL    2,602,292
FUEL-AIR MIXING DEVICE
Filed March 31, 1951
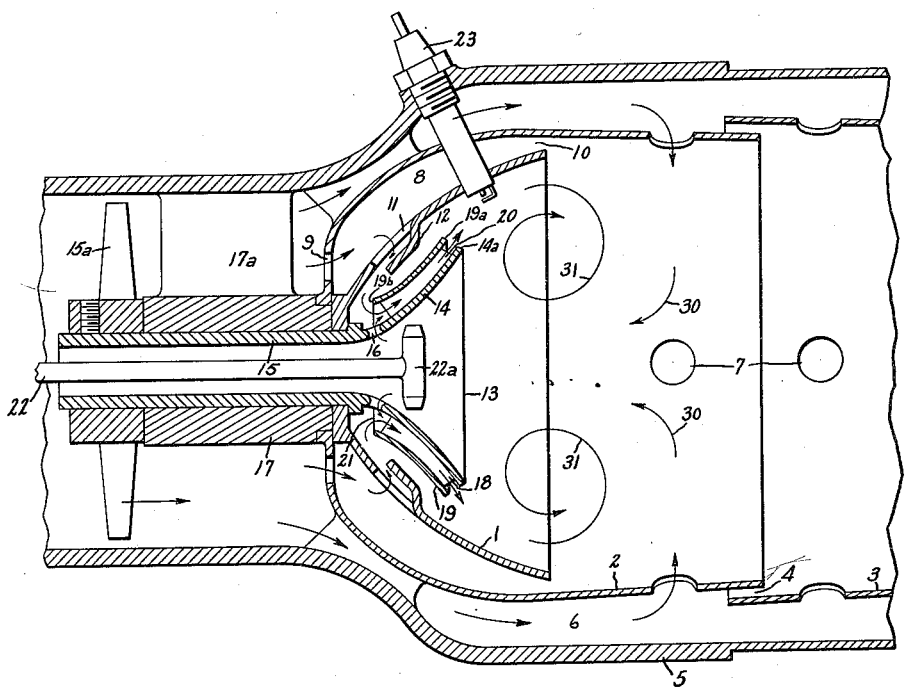
Inventors:
Bruce O. Buckland,
Anthony J. Nerad,
by Ernest F. Britton
Their Attorney.

Patented July 8, 1952

2,602,292

UNITED STATES PATENT OFFICE 2,602,292

FUEL-AIR MIXING DEVICE

Bruce O. Buckland, Schenectady, and Anthony J. Nerad, Alplaus, N. Y., assignors to General Electric Company, a corporation of New York Application March 31, 1951, Serial No. 218,682

2 Claims. (Cl. 60—39.74)

This invention relates to combustion chambers of liquid fuel burning apparatus and, more particularly, to the devices used to introduce and atomize the fuel therein and to mix the fuel particles with the "primary air."

The invention will be shown and described as employed in the type of combustion chamber disclosed by Anthony J. Nerad in his copending application, Serial No. 750,015, filed May 23, 1947, now Patent No. 2,601,000, an improved form of which is disclosed in the United States Patent of Bruce O. Buckland, 2,547,619, issued April 3, 1951, both assigned to the same assignee as the present application. However, the invention is not restricted to use in that exact type of combustion chamber, since it may also be employed with desirable results in other types of combustion chambers.

It is an object of this invention to provide a new and improved device for introducing fuel into the combustion chambers of liquid fuel burning apparatus.

It is a further object of this invention to provide improved means for aiding in the creation of the fuel and air mixing circulation in the primary zone of a combustion chamber.

This invention involves the use of a rotary centrifugal type air impeller as an atomizer for liquid fuels. This result is accomplished by introducing the fuel into the air stream leaving the impeller so that a fuel and air spray cone is formed. The fuel and air mixing circulation in the primary zone of the combustion chamber may be aided by the air impeller taking a portion of its suction from the hot gases at the center of the chamber.

For a better and more complete knowledge of this invention, reference should be made to the following description, together with the accompanying drawing which is a longitudinal sectional view of the closed end portion of a combustion chamber including the fuel-air mixing device proposed by the invention.

Referring to the drawing, the closed end portion of the combustion chamber is defined by an end dome 1, an end wall or liner section 2, and an intermediate wall or liner section 3. The remaining liner sections which extend to the discharge end of the chamber are not shown. Liner section 3 telescopes on liner section 2, but is radially spaced so as to provide an annular inlet opening 4 to the combustion chamber. An outer casing 5 is spaced from the liners 2 and 3 to provide a passage 6 from the discharge of an air compressor (not shown) to the circumferentially spaced air inlet holes 7 in the liners 2, 3, and to the annular inlet opening 4. The end liner section 2 forms a shroud spaced from the end dome 1, the space 8 therebetween being connected to the air supply passage 6 by a ring of perforations 9 in the end liner 1, and to the combustion space proper by the annular opening 10 and the circumferentially spaced holes 11 in the end dome 1. Louvers 12 are attached to, or struck inwardly from, the wall of the end dome 1 to properly direct the air flowing through holes 11.

The end dome 1 and the end liner section 2 are joined together at their closed ends, and disposed through their central portions, i. e., through the central portion of the closed end of the combustion chamber, is a fuel atomizing device. This device has a rotor member 13 shaped roughly in the form of a funnel with its hollow cone end portion 14 opening toward the discharge end of the combustion chamber and its hollow cylindrical shaft portion 15 disposed through the central portion of the closed end of the combustion chamber. An air turbine 15a is mounted on the shaft portion 15 at its extremity. Adjacent to the point at which the rotor member changes from a cylindrical to a conical section, it is pierced with a ring of circumferentially spaced holes 16.

The rotor member 13 is rotatably supported by a bearing 17, which is held spaced from the casing 5 by a web structure 17a, and is turned at high speed in normal operation by air turbine 15a actuated by the high pressure air leaving the compressor discharge, or by other suitable means such as gears or an electric motor.

To the outer surface of the hollow cone end portion 14 of the rotor member 13 are secured a plurality of circumferentially spaced axially and radially extending blades 18. Disposed around and secured to the blades 18 is an annular shroud member 19. The shroud 19 has an outer circumferential edge portion 19a disposed substantially adjacent to and spaced radially from the circumferential base edge 14a of the cone end portion 14 so as to define an annular outlet opening 20, and an inner circumferential edge portion 19b spaced axially away from the wall of end dome 1 so as to define an annular inlet opening 21. The rotor member 13, with its blades 18 and annular shroud 19, is in effect a centrifugal type air impeller.

Extending through the central portion of the closed end of the combustion chamber and contained within the axially extending center bore of the rotor member 13 is a tube 22. This tube is provided with end nozzle means 22a so that liquid fuel issues from it and strikes the inner conical surface of rotor wall 14.

A suitable spark plug 23, or equivalent device, for igniting the fuel-air mixture extends through outer casing 5, end liner 2, and end dome 1 into the combustion space proper.

As is more fully described in the above-mentioned application of Anthony J. Nerad, Serial No. 750,015, the combustion air inlet holes 7 in the liner sections are arranged so as to provide a characteristic air flow pattern in the primary mixing zone adjacent the closed end of the combustion chamber. The operation of the fuel atomizing rotor of our invention, in relation to this air flow pattern, is as follows:

The air in passage 6, being under pressure with respect to the combustion space within the liner, flows in strong discrete radial jets through holes 7. The jets from each ring of holes meet at the center of the chamber, impinging into each other. At this center point, at least a portion of the air turns and flows axially. From the first two or three rings of holes 7 adjacent the closed end of the combustion chamber, the air flows axially toward that end, as indicated by arrows 30. This "reverse flow" is greatly enhanced by the low pressure area created at the center of the combustion space by the rotating fuel atomizing device, which draws air through holes 16 in the rotor member and into the annular inlet openings 21.

Air entering the chamber through the annular openings 4 and 10 in a direction parallel to the liner walls is intended primarily as a protective cooling envelope to prevent carbon from forming on the liners, but some of it will become entrained in the jets of air entering through holes 7 and be drawn toward the closed end of the chamber. The air entering through holes 11 and directed radially inwardly along the closed end wall surface louvers 12 serves as a protective envelope for the end dome 1 before being drawn into the inlet opening 21 of the fuel atomizing device. This "cooling air envelope" is, of course, somewhat preheated by flowing along the hot wall of end dome 1.

The jets of combustion air which enter through holes 7 are heated by the burning gases which are flowing toward the discharge end of the chamber through the spaces between the jets. The air entering through holes 11 is heated by intermingling with that from holes 7 as the air streams are combined in the fuel atomizing device. The combined preheated air stream is discharged at high velocity from the annular outlet opening 20 in a flow shaped to fit the combustion chamber contour.

The liquid fuel is introduced through nozzle 22a and strikes the inner conical surface 14 of the rotor. Centrifugal force causes the fuel to be distributed evenly over the surface of the cone and to be discharged radially from its outer circumferential edge 14a. This fuel stream leaving the edge 14a is thus projected across the high velocity preheated gas stream leaving the annular outlet opening 20. The interaction of the preheated gas flow with the fuel stream causes turbulent mixing which readily vaporizes the fuel.

The high velocity gas flow from the outlet 20, in combination with the strong combustion jets from ports 7, causes the fuel-air mixture to flow in a symmetrical double opposed spiral path, or "tore," between the fuel atomizing device and the first ring of holes 7, as indicated by arrows 31. This toroidal flow establishes a thorough mixing of the fuel and air which is relatively independent of the load on the combustion unit. This aids to maintain flame under rapid changes in fuel or air flow. The fuel and air mixture forming the tore is readily ignited by the spark plug 23, also over a wide range of air flow rates.

One of the major advantages of this new fuel atomizing means is that, by taking a substantial part of its suction from the hot gases at the center of the combustion chamber through the ports 16, the device helps produce a strong "tore" and mixing circulation. Moreover, by whirling the rotor at high speeds, on the order of 4000 R. P. M., a fine atomization of the fuel is obtained. This means that the device is particularly applicable for use with heavy fuels. A still further advantage is that a relatively large area pipe can be used to introduce fuel to the combustion chamber, so the danger of clogging the small passages in the conventional fuel spray nozzles is eliminated.

The strength of the "tore" circulation can be varied by changing the speed of rotation of the fuel atomizing impeller 14. Thus, a stable "tore" can be maintained over an extremely wide range of air flows.

Although this fuel atomizing device has been described with respect to a combustion chamber having a particular pattern of air inlet ports, it is not meant that its use will be confined to a chamber having that exact arrangement, since the fuel atomizing and mixing arrangement constituting the present invention may be found applicable to many other types of combustion systems. Furthermore, many modifications will occur to those skilled in the art and it will, therefore, be understood that we intend by the appended claims to cover all such modifications as fall within the true spirit and scope of our invention.

What we claim as new and desire to secure by Letters Patent in the United States is:

1. In an axially elongated combustion chamber for the burning of liquid fuels, one end of which discharges hot reaction products, a fuel atomizing device comprising a rotor member having a hollow cylindrical shaft portion disposed through the central portion of the closed end wall and a hollow cone-shaped end portion opening toward the discharge end of the chamber, said rotor member having a ring of circumferentially spaced holes adjacent the point at which said rotor member changes from a cylindrical to a conical section, a plurality of circumferentially spaced axially and radially extending blades secured to the outer surface of said cone, an annular shroud member disposed around and secured to said blades, said shroud cooperating with said rotor member to define an annular inlet opening and an annular outlet opening, means for rotating said rotor member at high speed, means for delivering liquid fuel to the inner conical surface of the rotor whereby centrifugal force causes the fuel to be distributed evenly over the inner surface of the cone and discharged radially from the outer circumferential edge thereof, while hot gases at the central portion of the combustion space are drawn through said holes and into the annular inlet opening and discharged at high velocity from said blades across the fuel stream leaving the base edge of the cone whereby the liquid fuel is atomized and vaporized by turbulent mixing with hot gas recirculated from the combustion space.

2. In an axially elongated combustion chamber for the burning of liquid fuels closed at one end and open at the other for the discharge of hot reaction products, a fuel atomizing device comprising a rotor member having a hollow cylindrical shaft portion disposed through the central portion of the closed end of the chamber and having an end portion substantially in the form of a hollow cone opening toward the discharge end of the combustion space, said rotor member having a row of circumferentially spaced holes adjacent the smaller diameter end of the conical section, bearing means rotatably supporting said rotor member, means for rotating said rotor member at high speed in normal operation, a plurality of circumferentially spaced axially and radially extending blades secured to the outer surface of said cone, an annular shroud member disposed around and secured to said blades, said shroud having an outer circumferential edge portion disposed substantially adjacent and spaced radially from the circumferential base edge of the cone to form an annular discharge opening and an inner circumferential edge portion spaced axially away from the closed end wall of the combustion chamber to define an annular inlet opening, and means for delivering liquid fuel to the inner conical surface of the rotor whereby centrifugal force causes the fuel to be distributed evenly over said surface and discharged radially from the outer circumferential base edge thereof, while gases in the center of the combustion space are drawn through said holes into the annular impeller inlet opening and discharged at high velocity from said blades across the fuel stream leaving the base edge of the cone, whereby the liquid fuel is atomized and vaporized by turbulent mixing with hot gas recirculated from the combustion space.

BRUCE O. BUCKLAND.
ANTHONY J. NERAD.

REFERENCES CITED

The following references are of record in the file of this patent:

UNITED STATES PATENTS

| Number | Name | Date |
|---|---|---|
| 1,979,757 | Mélot | Nov. 6, 1934 |
| 2,011,606 | Barthel | Aug. 20, 1935 |
| 2,204,170 | Zwilling | June 11, 1940 |
| 2,520,388 | Earl | Aug. 29, 1950 |
| 2,536,600 | Goddard | Jan. 2, 1951 |